Patented Mar. 6, 1928.

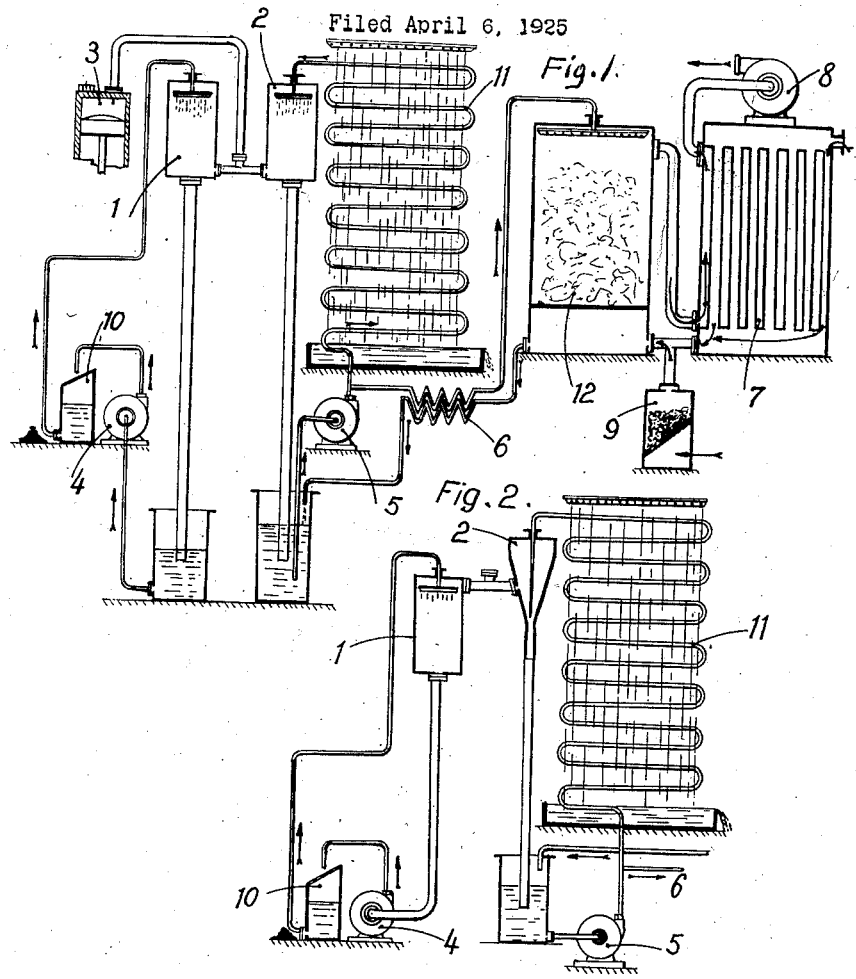

1,661,489

UNITED STATES PATENT OFFICE.

PIERRE JEROME DE SAINT ANDRÉ MEYNARDIE, OF PARIS, FRANCE.

APPARATUS FOR CONCENTRATING AQUEOUS LIQUIDS.

Application filed April 6, 1925, Serial No. 21,219, and in France April 16, 1924.

The present invention relates to an apparatus for effecting the concentration of aqueous liquids by boiling and partial solidification in the form of ice or snow together with suitable separation, whilst it is also possible to recover heat from the liquids or gases entering or leaving the apparatus.

The accompanying Figures 1 and 2 which are purely diagrammatic, show different arrangements according to the invention of the several members comprised in a complete plant. In the several diagrams the same reference numbers relate to the same parts.

Referring to Fig. 1 the complete plant comprises the following machines and apparatus.

1 is a tower through which circulates the fluid to be concentrated or to be cooled. It is connected with a second tower 2 for absorption, in which circulates the chemical agent for absorbing the water vapour. A vacuum pump 3, connected by means of suitable pipes with the bottoms of the towers 1 and 2 maintains a vacuum so as to ensure the reasonable progress of the absorption and the concentration or cooling, without there being produced in said towers any deposits of ice which might block the pipes.

In the structure shown in Figure 1, both the tower 1 and the absorber 2 are maintained under a constant vacuum, but because the vapor pressure of water or other liquid evaporated in evaporator 1 will be greater than the vapor pressure of the water or liquid in the absorber tower 2, there will be a flow of vapor from 1 to 2 in spite of the vacuum applied as shown. In other words the absolute pressures in the absorber 2 will be less than the absolute pressure in tower 1. As an example of this phenomena, the temperature of the liquid in tower 1 undergoing evaporation, may be 0° C., and at that temperature the vapor pressure of water is 4.3 mm. of mercury. If sulphuric acid is used as the absorbing liquid in the absorber 2 and the sulphuric acid has a concentration of about 34% water and 64% monohydrate, the vapor tension of water vapor above the sulphuric acid will be 2.2 mm. of mercury. These vapor tensions are functions of temperature alone and not pressure and therefore keeping the tower 1 and the absorber 2 under a vacuum does not effect the vapor pressures, but does considerably enhance the rapidity of concentration. Since the absolute vapor pressures in tower and absorber 2 differ, there must of necessity be a flow of water vapor from 1 to 2. The rapidity of the flow is increased as the vacuum is increased and for this reason a high degree of vacuum is advantageous.

The liquids are exhausted either by means of barometric column or by extraction pumps shown at 4 and 5. The pump 4 discharges into a settling sump 10, which may be provided with a filter as indicated to separate the solidified particles, either ice or snow or salts or hydrates, which precipitate owing to the lowering of the temperature. The part remaining aqueous is sucked up by the vacuum into the upper part of the tower 1. The pump 5 discharges the absorbent liquid (glycerine, aqueous solution of phosphoric acid or of sulphuric acid of the necessary degree of concentration) into a cooling coil to absorb the heat of hydration and of reaction given off by the passage through the absorption tower 2. This coil may be immersed or trickled over as shown at 11, so as to bring back the absorbent to the lowest possible temperature.

The apparatus is completed by an arrangement for the partial or complete regeneration of the absorbent liquid, which is taken up again either by a special pump or by a connection on the discharge of the pump 5. The absorbent liquid to be regenerated passes through a heat-exchanger 6, and then flows into the upper part of an evaporating tower with open fire constituted by a chimney 12 packed with contact material. This tower acts as a dryer of which the drying material is previously heated in the contraflow heat exchanger 6 by the dried material which is thus cooled and needs only to undergo supplementary cooling in the coil 11.

The drying tower emits hot gases the heat of which it is desirable to recover. The heat exchanger 7, the fan 8 and the grate 9 for the additional heat units required are the members for this recovery. The additional heat supply may equally well be obtained from the exhaust gases of an internal combustion engine.

If the fluid treated is just water the apparatus yields a continuous supply of ice. In a modification of the apparatus Fig. 2 for the tower 2 there is substituted an ejector which acts simultaneously as absorber and as vacuum pump, being supplied as shown by the absorbent fluid.

In the towers 1 and 2 the part of the fluid which is not frozen entrain the part which is frozen. The mixture being a kind of mush can be removed from the apparatus without destroying the vacuum. The solidified portions can be removed outside of the apparatus at atmospheric pressure in a decanting vessel or a filter as shown at 10. The liquid part re-enters the crystallization chamber by the pipe which connects the filter 10 to the tower 1, the height of which must be of course at least barometric.

From the above it follows that 1 and 2 are constantly empty, no liquid being kept in them; if it was not so the superficial solidification in 1 would stop the whole process.

The refrigeration of the absorbent takes place in a well known type of refrigerator and its regeneration is obtained by drying, that is by evaporation without boiling. This method saves the loss of absorbent which would take place if steam was produced for said steam would carry out with it some absorbent.

I claim:

1. The method of evaporating liquids which comprises introducing a stream of liquid to be evaporated into a vacuum, causing the evaporation of said liquid to produce a mixture of finely divided solidified material and liquids, rapidly removing the said mixture from said vacuum to prevent the accumulation of the solidified particles, and separating the solidified material from the liquid.

2. The process of evaporating water which comprises introducing a stream of water into a vacuum, causing the evaporation of a part of said water to form a mixture of water and finely divided ice, rapidly removing the said mixture from the vacuum space to prevent the accumulation of said ice, and separating the ice from the liquid.

In testimony whereof I hereunto affix my signature.

PIERRE JEROME de ST ANDRÉ MEYNARDIE.